United States Patent

Shibato et al.

[11] Patent Number: 5,523,164
[45] Date of Patent: Jun. 4, 1996

[54] METHOD FOR FORMING A PAINT FILM AND COATING OBTAINED BY THE METHOD

[75] Inventors: Kishio Shibato, Kanagawa-Ken; Masataka Kawamura, Kanagawa; Atsushi Sato; Shigekazu Sato, both of Yokohama, all of Japan

[73] Assignee: BASF Lacke + Farben, AG, Muenster-Hiltrup, Germany

[21] Appl. No.: 424,416

[22] PCT Filed: Oct. 30, 1993

[86] PCT No.: PCT/EP93/03035

§ 371 Date: Jun. 23, 1995

§ 102(e) Date: Jun. 23, 1995

[87] PCT Pub. No.: WO94/09916

PCT Pub. Date: May 11, 1994

[30] Foreign Application Priority Data

Nov. 4, 1992 [JP] Japan .................. 4-319317

[51] Int. Cl.⁶ .................................... B05D 7/14
[52] U.S. Cl. .................. 428/461; 428/463; 427/409; 427/515; 427/518; 427/520
[58] Field of Search .................. 427/409; 428/461, 428/463, 515, 520, 518

[56] References Cited

U.S. PATENT DOCUMENTS 4,879,337 11/1989 Shibato et al. .................. 524/504

FOREIGN PATENT DOCUMENTS 382454 8/1990 European Pat. Off. .

*Primary Examiner*—Shrive Beck
*Assistant Examiner*—Erma Cameron
*Attorney, Agent, or Firm*—Anne Gerry Sabourin

[57] ABSTRACT

Method for forming paint films by the 2-coats/1-bake method, using a clearcoat paint in which the resin component comprises (a) a copolymer of a vinyl monomer mixture containing at least 20 wt % (meth)acrylic acid cycloalkyl esters 40–90 wt %, (b) alkyl-etherified melamine resin 5–50 wt %, and (c) blocked polyisocyanate 5–50 wt %, and a basecoat paint in which the resin component comprises (d) a copolymer of a vinyl monomer mixture containing at least 10% of monomers represented by the general formula

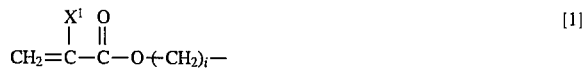

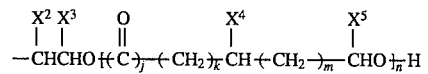

($X^1$–$X^5$ are H or a methyl group, i is 0–2, j is 0 or 1, k is 0–3, m is 0–3, and n is 1–10), 40–80 wt %, (e) alkyl-etherified melamine resin 10–50 wt %, (f) blocked polyisocyanate 0–40 wt %, (g) cellulose type resin 0–20 wt %, and (h) organic crosslinked fine particles 0–30 wt %, and coatings obtained by the said method.

4 Claims, No Drawings

METHOD FOR FORMING A PAINT FILM AND COATING OBTAINED BY THE METHOD

This application is a 371 of PCT/EP93/03035, filed Oct. 30, 1993.

The present invention relates to a novel method for forming paint films and to coatings obtained by the method. More specifically, the present invention relates to a method for forming topcoat paint films which are particularly excellent in acid resistance and scratch resistance, and have excellent flexibility and adherence when recoated, and to coatings obtained by means of this method for forming paint films.

In recent years, the durability of paint films, and particularly rain stains due to acid rain and scratching due to car-wash brushes or sand particles thrown up during travelling, have been giving problems as far as automobile paint films are concerned.

Prior known measures to solve such problems include the application of clear coats using Ÿ-caprolactone-modified acrylic resins and melamine hardeners (Japanese Unexamined Patent [Kokai] 64-66274), for example, for scratch resistance, and the application of clear coats in which carboxylic acids and epoxy reaction are used with acrylic resins and melamine curing agents, for example, for acid resistance (Japanese Unexamined Patent 4-114069).

However, with the former technique paint films with excellent scratch resistance are obtained, but resistance to acid raid is inadequate; and with the latter technique paint films with excellent acid resistance are obtained, but scratch resistance is inadequate.

Raising the glass transition temperature of the cured clearcoat paint film of the outer surface layer is also known to be an effective method for obtaining a higher degree of acid resistance, but this has the problem that it invites undesirable conditions such as lowering the bending resistance and recoating adhesion of the paint film, as well as lowering scratch resistance.

Therefore, it has been extremely difficult to find a technique giving paint films which have a balance of high levels of acid resistance and scratch resistance and are also excellent in bending resistance and recoating adhesion.

Given this situation, the present inventors have made it their aim to offer a method for forming paint films by the 2-coats/1-bake method in which the paint films are provided with a balance of high levels of both acid resistance and scratch resistance, together with excellent bending resistance and recoating adhesion, and coatings obtained by this method.

As the result of concerted research to achieve the aforementioned aim, the present inventors discovered that the aim can be achieved by combining a clearcoat paint in which the resin component comprises a copolymer of a vinyl monomer mixture containing specified quantities of (meth)acrylic acid cycloalkyl esters, alkyl-etherified melamine resin and blocked polyisocyanate compounds, and a basecoat paint in which the resin component comprises a vinyl type copolymer having hydroxyl groups placed at positions separated from the main chain, alkyl-etherified melamine resin and possibly blocked polyisocyanate compounds and/or cellulose type resin; and they have perfected the present invention based on this insight.

Thus, the present invention offers a method for forming paint films characterised in that, in forming a paint film by coating a basecoat paint including a colouring and after then coating a clearcoat paint over the top curing the said basecoat and clearcoat simultaneously by heating, a paint in which the resin component comprises (a) a copolymer of a vinyl monomer mixture containing at least 20% by weight as cycloalkyl esters of acrylic acid or methacrylic acid 40–90% by weight, (b) an alkyl-etherified melamine resin 5–50% by weight, and (c) blocked polyisocyanate compounds 5–50% by weight, is used as the said clearcoat paint, and a paint in which the resin component comprises (d) a copolymer of a vinyl monomer mixture containing at least 10% by weight as monomers represented by the general formula

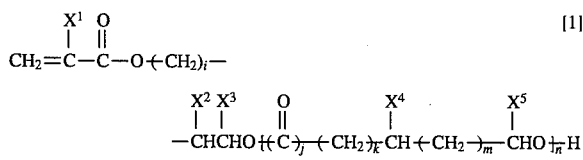

(In the formula, $X^1$–$X^5$, which may be the same or different, are each a hydrogen atom or a methyl group; i is 0 or 1 or 2; j is 0 or 1, k is 0 or an integer 1–3; m is 0 or an integer 1–3; and n is an integer 1–10)
40–80% by weight, (e) an alkyl-etherified melamine resin 10–50% by weight, (f) blocked polyisocyanate compounds 0–40% by weight, (g) a cellulose type resin 0–20% by weight, and (h) crosslinked organic fine particles having a particle size of 0.01–5 µm 0–30% by weight, is used as the said basecoat paint, and coatings obtained by this method.

Below the present invention will be explained in detail. In paint films obtained by the method for forming paint films of the present invention, the clearcoat has a high glass transition temperature and excellent acid resistance, and because blocked polyisocyanate compounds are used it also has excellent scratch resistance based on the cohesive force of urethane bonds. And because in the basecoat a vinyl type copolymer having hydroxyl groups positioned separate from the main chain via by flexible atomic groupings is used in combination with a melamine resin and possibly a blocked polyisocyanate curing agent, bending resistance and recoating adhesion are excellent.

The copolymer of Component (a) used in the clearcoat paint in the method of the present invention can be obtained by usual free radical copolymerization of a (meth)acrylic acid cycloalkyl ester with a vinyl monomer containing hydroxyl groups and/or other vinyl monomer(s). As (meth)acrylic acid cycloalkyl esters here, for example cyclohexyl (meth)acrylate, isobornyl (meth)acrylate, tetracyclo[4,4,0,1$^{2,9}$,1$^{7,10}$]dodecyl-3-(meth)acrylate, adamantyl (meth)acrylate, t-butylcyclohexyl (meth)acrylate, and 2-(meth)acryloyloxyethylhexahydrophthalic acid, etc., can be cited; 1 of these can be used, or a combination of 2 or more can be used. The said (meth)acrylic acid cycloalkyl ester needs to be used at at least 20 wt % in the total vinyl monomer mixture used to obtain Component (a). If the quantity employed is less than 20 wt % the acid resistance of the paint film obtained is inadequate, and the purpose of the present invention cannot be achieved. Similarly, examples of the aforementioned vinyl monomers containing hydroxyl groups include (meth)acrylic hydroxyalkyl ethers such as 2-hydroxyethyl (meth)acrylate, 2-hydroxypropyl (meth)acrylate, 3-hydroxypropyl (meth)acrylate and hydroxybutyl (meth)acrylate, etc., monoethers of polyether polyols such as polyethylene glycol, polypropylene glycol and polybutylene glycol and vinyl monomers containing hydroxyl groups such as 2-hydroxyethyl (meth)acrylate, etc., addition compounds of α-β unsaturated carboxylic acids with monoepoxy compounds such as Cardura E10 (trade name, Shell Petroleum Chemicals) or α-olefin epoxides, addition compounds of glycidyl (meth)acrylate with monobasic acids such as acetic acid, propionic acid, p-(t-butyl)benzoic acid or fatty acids, monoester compounds or diester compounds of vinyl monomers having acid anhydride groups such as maleic anhydride or itaconic anhydride with glycols such as ethylene glycol, 1,6-hexanediol or neopentyl glycol, etc., hydroxyalkyl vinyl ethers such as hydroxyethyl vinyl ether, and lactone-modified vinyl monomers made by addition of 1–10 mols of lactones such as ε-caprolactone, β-methyl δ-valerolactone, γ-valerolactone, δ-valerolactone, δ-caprolactone, γ-caprolactone, -propionolactone or γ-butyrolactone to a (meth)acrylic acid hydroxyalkyl ester such as 2-hydroxyethyl (meth)acrylate, 2-hydroxypropyl (meth)acrylate or hydroxybutyl (meth)acrylate, etc.; 1 of these can be used, or they can be used in combinations of 2 or more.

Moreover, examples of other vinyl monomers include methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, tridecyl (meth)acrylate, stearyl (meth)acrylate, styrene, -methylstyrene, vinyltoluene, (meth)acrylonitrile, (meth)acrylamide, vinyl acetate, (meth)acrylic acid and glycidyl (meth)acrylate; 1 of these can be used, or 2 or more can be used in combination.

It is desirable that the glass transition temperature of the copolymer of Component (a) be at least 30° C., in order to confer on the final paint film the excellent acid resistance desired. The copolymer of Component (a) can be obtained by carrying out a copolymerization reaction according to usual methods using a mixture of the aforementioned vinyl monomers, in the presence of a known initiator such as for example azobis(isobutyronitrile), benzoyl peroxide, t-butyl perbenzoate, t-butyl hydroperoxide, t-butyl octanoate, t-butyl peroxide or cumene hydroperoxide, etc.

The alkyl-etherified melamine resin of Component (b) used in the clearcoat paint of the present invention can be obtained by methylolation and alkyl etherification of aminotriazine with cyclohexanol or an alkanol of 1–6 carbons, and butyl-etherified melamine resin methyl-etherified melamine resin and butyl/methyl-etherified melamine resin, etc., can be cited. Specific examples of butyl-etherified melamine resin include U-Van (trade name, Mitsui Toatsu Chemicals), and Super Beckamine (trade name Dainippon Ink & Chemicals), etc.; and specific examples of methyl-etherified melamine resins and butyl/methyl-etherified melamine resins include Cymel (trade name, Mitsui Cyanamid) and Nikalac (trade name, Sanwa Chemicals), etc.

Examples of blocked polyisocyanate compounds of Component (c) which can be used in the clearcoat paint in the present invention include non-yellowing polyisocyanate compounds, and more specifically polyisocyanate compounds such as hexamethylene diisocyanate, trimethylhexamethylene diisocyanate, isophorone diisocyanate, hydrogenated diphenylmethane diisocyanate and hydrogenated xylylene diisocyanate, etc., and their adducts, biurets and isocyanurates, blocked by normal isocyanate blocking agents such as for example phenol and phenols such as m-cresol, xylenol and thiophenol, etc., alcohols such as methanol, ethanol, butanol, 2-ethylhexanol and cyclohexanol, etc., and compounds such as caprolactam, methyl ethyl ketone oxime, ethyl acetoacetate and diethyl malonate, etc., containing active hydrogen.

The proportions of each of the resin components used in the clearcoat paint in the present invention need to be within the ranges Component (a) 40–90 wt %, Component (b) 5–50 wt % and Component (c) 5–50 wt %, based on the total weight of the resin components. With the said Component (a) here at less than 40 wt % the bending resistance of the final paint film is inadequate, and if it exceeds 90 wt % scratch resistance is lowered. Similarly, with Component (b) at less than 5 wt % solvent resistance is inadequate, and if it exceeds 50 wt %, acid resistance is lowered. Moreover, with Component (c) at less than 5 wt % scratch resistance is inadequate, and if it exceeds 50 wt % the cured paint film will be prone to yellowing.

The copolymer of Component (d) used in the basecoat paint in the present invention is obtained by copolymerizing a monomer represented by the general formula

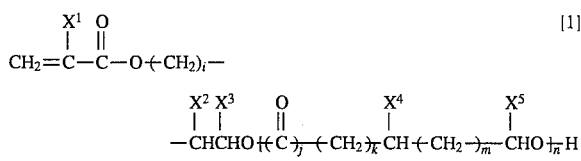

(In the formula $x^1$–$x^5$ i, j, k, m and n have the same meanings as previously) with other vinyl monomers. Examples of monomers represented by General Formula [1] here include monoethers of polyether polyols such as polyethylene glycol, polypropylene glycol, and polybutylene glycol, etc., with vinyl monomers containing hydroxyl groups such as 2-hydroxyethyl (meth)acrylate or 2-hydroxypropyl (meth)acrylate, etc., monoester compounds or diester compounds of vinyl monomers containing acid anhydride groups, such as maleic anhydride and itaconic anhydride, etc., with glycols such as polyethylene gly[co]l, polypropylene glycol and 1,6-hexanediol, etc., and lactone-modified vinyl monomers with 1–10 mols of lactone such as ε-caprolactone, β-methyl-δ -valerolactone, γ-valerolactone, δ-valerolactone, -δcaprolactone, γ-caprolactone, β-propionolactone or -γbutyrolactone, etc., added to a vinyl monomer containing a hydroxyl group, such as 2-hydroxyethyl (meth)acrylate, 2-hydroxypropyl (meth)acrylate or hydroxybutyl (meth)acrylate, etc.; 1 of these can be used, or they can be used in combinations of 2 or more.

Other vinyl monomers include vinyl monomers which can be used to obtain the aforementioned Component (a), and 2-hydroxyethyl (meth)acrylate, 2-hydroxypopyl (meth)acrylate and hydroxybutyl (meth)acrylate, etc.; 1 of these can be used, or a combination of 2 or more can be used.

In the mixture of vinyl monomers used to obtain the copolymer of the said Component (d), monomers represented by the aforementioned General Formula [1] need to be used at at least 10 wt %. When this quantity is less than 10 wt %, bending resistance and recoating adhesion are lowered and the purpose of the present invention cannot be achieved. The copolymer of the said Component (d), like the copolymer of the aforementioned Component (a), can be obtained by carrying out a copolymerization reaction according to a usual method in the presence of a known initiator.

The alkyl-etherified melamine resin of Component (e) and the blocked polyisocyanate compounds of Component (f) used in the basecoat paint in the present invention can be the same as the alkyl etherified melamine resin of the aforementioned Component (b) and the blocked polyisocyanate compounds of the aforementioned Component (c). The cellulose type resin of Component (g) is used to facilitate 2-coat/1-bake coating; examples include cellulose acetate/butyrate resins such as CAB-381-0.5, ditto 381-2, ditto 531-1 and ditto 551- 0.5 (trade names, Eastman-Kodak), etc.

Moreover, the organic crosslinked fine particles of a particle size of 0.01–5 μm of Component (h) used in the basecoat paint in the method of the present invention are used to facilitate 2-coats/1-bake painting, and fine particles which do not dissolve in organic liquids are desirable. Such organic crosslinked fine particles can be obtained, for example, by emulsion polymerizing a vinyl monomer with a crosslinkable divinyl, trivinyl or tetravinyl monomer in an aqueous medium to form a fine particle copolymer, and then removing water by solvent exchange, azeotropic boiling, centrifugal separation, filtration, or a drier, etc., or by carrying out a condensation reaction to copolymerize a vinyl monomer and a crosslinkable vinyl monomer in the presence of a dispersing/stabilizing agent in a nonaqueous organic solvent such as an aliphatic hydrocarbon, etc., which will dissolve the vinyl monomers but will not dissolve the polymer, to obtain organic crosslinked fine particles by the so-called NAD method.

The proportions of each of the resin components used in the basecoat paint in the method of the present invention, based on the total weight of resin components, need to be in the ranges Component (d) 40–80 wt %, Component (e) 10–50 wt %, Component (f) 0–40 wt %, Component (g) 0–20 wt % and Component (h) 0–30 wt %. With the said Component (d) here at less than 40 wt % the bending resistance of the paint film obtained is inadequate, and if it exceeds 80 wt % solvent resistance is lowered. With the said Component (e) at less than 10 wt % solvent resistance is weakened, and if it exceeds 50 wt % bending resistance is lowered. Similarly, if Component (f) exceeds 40 wt % the cured paint film will become prone to yellowing.

Moreover, if Component (g) exceeds 20 wt % or Component (h) exceeds 30 wt % recoating adhesion will be lowered.

With the method of the present invention it is desirable that the glass transition temperature of the cured clearcoat film is at least 70° C., and preferably in the range 70°–150° C., in order to obtain the excellent acid resistance desired. Bending resistance is lowered if the said glass transition temperature exceeds 150° C., so this is not preferred. In addition to the aforementioned Components (a), (b) and (c) in the clearcoat paint used in the method of the present invention, polymers such as acrylic polymers, polyester polymers, urethane polymers, non-water-dispersible acrylic polymers and crosslinked polymer particles, etc., and also additives commonly used in prior paints such as colourings such as pigments and dyes, etc., pigment dispersants, thickeners, anti-dripping agents levelling agents, curing catalysts, anti-gelling agents, UV protecting agents and free-radical quenching agents, etc., can be added as required, within ranges that do not adversely prejudice the purpose of the present invention.

Similarly, in addition to the aforementioned Components (d), (e), (f), (g) and (h) in the basecoat paint used in the present invention, various colourings, for example metallic pigments such as squamatose metallic powders such as aluminium, copper, brass, bronze, sheet iron oxide, etc., and mica fragments coated with titanium oxide, etc., colouring pigments such as for example inorganic pigments such as titanium dioxide, red ochre, yellow ferric oxide and carbon black, etc., and organic pigments such as phthalocyanin blue, phthalocyanin green and quinacridone red pigments, red azo pigments, perilene red pigments and isoindolinone yellow pigments, etc., can be employed. Moreover, additives generally used in prior paints such as thickeners, anti-dripping agents, levelling agents, curing catalysts, pigment dispersants, anti-gelling agents, ultraviolet-absorbing agents and free radical quenching agents, etc., can also be added.

In painting the clearcoat paint and the basecoat paint in the method for forming paint films of the present invention, they can be diluted before use with commonly used paint solvents such as aromatic solvents, ester solvents, ketone solvents and alcohol solvents, etc.

In the present invention, paint films can be formed by 2-coats/1-bake treatment with the same methods as conventionally used, using the aforementioned basecoat paint and clearcoat paint. For example, the basecoat can be adjusted to a viscosity of the order of 10–30 seconds (Ford Cup No. 4/20° C.), and this can be painted on to an object to be painted by air spraying, air respraying or electrostatic coating, etc., to give a cured film thickness of the order of 10–30 μm. Then, after standing for several minutes at room temperature, the clearcoat paint, adjusted to a viscosity of the order of 15–50 seconds (Ford Cup No. 4/20° C.), can be painted by air spraying, air respraying or electrostatic coating, etc., to give a cured film thickness of the clearcoat only of the order of 20–50 μm, and the basecoat and clearcoat paint films can both be cured simultaneously.

A cured paint film can usually be obtained by allowing a setting time of the order of 5–30 minutes after coating the clearcoat paint to make the paint film adequately smooth and allow a certain degree of volatile dispersion of the solvent inside, followed by drying at a temperature of 100°–180° C. for about 10–120 minutes.

Next, the present invention will be explained in more detail by means of preparation examples, embodiments and comparison examples; however, the present invention is in no way limited by these examples.

Preparation example 1

Preparation of Copolymers C1–C4 and B1–B3

The xylene recorded in Table 1 was put into a 4-mouthed flask fitted with a thermometer, stirrer, reflux cooler and dropping funnel, and the temperature was raised to 140° C. Then, a mixture of monomers and polymerization initiators recorded in Table 1 was added dropwise at an even rate over 2 hours by means of the dropping funnel. After finishing dropwise addition, the contents were held at reflux temperature for 1 hour and cooled to 100° C. After cooling to 100° C. a polymerization initiator recorded in Table 1 was added dropwise at an even rate over 30 minutes. When the temperature was subsequently held at 100° C. for 3 hours to complete the polymerization reaction, solutions of Copolymers C1–C4 and B1–B3 with the properties recorded in Table 1 were obtained.

Notes.
1) CHMA: Cyclohexyl methacrylate
2) IBorMA: Isobornyl methacrylate
3) IBorA: Isobornyl acrylate
4) MMA: Methyl methacrylate
5) St: Styrene
6) 2HEMA: 2-Hydroxyethyl methacrylate
7) 4HBA: 4-Hydroxybutyl acrylate
8) FM2: Placcel (trade name, Daicel Chemical Industries; a monomer represented by the aforementioned General Formula [1], of 2-hydroxyethyl methacrylate with 2 mols of added Ÿ-caprolactone).
9) PP1000: Blemmer PP1000 (trade name, Nihon Oil & Fats; a monomer represented by the aforementioned General Formula [1], of 2-hydroxypropyl methacrylate with 4 mols of added propylene oxide)
10) BMA: n-Butyl methacrylate
11) EHA: 2-Ethylhexyl methacrylate
12) AA: Acrylic acid
13) t-BPBz: Polymerization initiator, t-butyl perbenzoate
14) t-BPEH: Polymerization initiator, t-butyl-2-ethylhexanoate

Preparation examples 2–9

Preparation of basecoat paints

Basecoat paints were made by mixing and dispersing the types and quantities of starting materials shown in Table 2 using a dissolver or paint shaker.

Notes
1) Super Bekamine L-116-70 (trade name, Nihon Ink Kagaku Kogyo KK; isobutylated melamine resin solution, heat residue 70 wt %)
2) Cymel 303 (trade name, Mitsui Cyanamid; methylated melamine resin, heat residue 98 wt %)
3) Yuban 20SE (trade name, Mitsui Toatsu Chemicals; butylated melamine resin, heat residue 60 wt %)
4) Takenate XB-72-G16 (trade name, Takeda Chemical Industries; non-yellowing blocked isocyanate compound solution, heat residue 60 wt %)
5) Coronate 2513 (trade name, Japan Polyurethane Industry; non-yellowing blocked isocyanate compound solution, heat residue 80 wt %)
6) CAB531-1 (trade name, Eastman Kodak; cellulose acetate/butyrate resin), 15 wt % butyl acetate solution
7) CAB381-2 (trade name, Eastman-Kodak; cellulose acetate/butyrate resin), 15% butyl acetate solution
8) Organic crosslinked fine particular polymer nonaqueous suspension prepared according to Table 5 Preparation Example B1 of Japanese Unexamined Patent [Kokai] 1-279902 (heat residue 50 wt %, particle content 35 wt %)
9) Alupaste 7160N (aluminium pigment product made by Toyo Aluminium; heat residue 65 wt %)
10) Rubicron Red 500RG (trade name of a quinacridone red pigment made by Toso KK)
11) Bengala KN-R (trade name of a red ochre made by Toda Industries)
12) Tinuvin 900 (trade name, Ciba-Geigy) 10% xylene solution
13) 20 wt % isopropyl alcohol solution of p-toluene sulphonic acid
14) Modaflo (trade name, Monsanto; levelling agent)

Preparation Examples 10–17

Preparation of clearcoat paints

The types and quantities of different starting materials shown in Table 3 were mixed and dispersed using a dissolver to make a clearcoat paint.

Notes)
1)–4), 6), 7), 9), 10) as above
Desmodur BL-3175 (trade name, Sumitomo Bayer Urethane; non-yellowing blocked isocyanate compound solution, heat residue 75 wt %]
Sanol LS292 (trade name, Mitsui) 10% xylene solution Embodiments 1–7 and Comparison Examples 1–3

Aqua No. 4200 (trade name, Nihon Oil & Fats cationic electrodeposition paint) was painted electrostatically onto zinc-phosphate-treated soft copper sheets to give a cured film thickness of 20 µm, followed by baking at 175° C. for 20 minutes. Then "Haiepiko" No. 100 (trade name, Nihon Oil & Fats, midcoat paint) was airspray painted on to give a cured film thickness of 40 µm and baked at 140° C. for 30 minutes to obtain the test pieces.

The basecoat paints of Preparation Examples 2–9 were diluted using a thinner (toluene/butyl acetate/isobutyl alcohol=50/30/20 w/w) to 13 seconds with Ford Cup No. 4 (20° C.), and the clearcoat paints of Preparation Examples 10–17 were diluted using a thinner (Solvesso 100/n-butyl alcohol= 70/30 w/w) to 25 seconds with Ford Cup No. 4 (20° C.).

The different diluted paints obtained were painted onto the above test pieces in the combinations shown in Table 4: painted sheets were finished by painting on the basecoat paint by air spraying in 2 stages with an interval of 1 minute 30 seconds to give a cured film thickness of 15 µm, followed by setting at normal temperature for 3 minutes, and then painting on the clearcoat paint by air spraying to give a cured film thickness of 40 µm, and baking at 140° C. for 30 minutes.

The paint performance tests shown in Table 5 were carried out on each of the finished painted sheets obtained. The results are shown in Table 5.

Notes 1)

Glass transition temperature: A free paint film was made and dynamic viscosities were determined with a Rheovibron DDV-II-EA (Orientic); the glass transition temperature was found from the temperature at which compound elasticity showed a peak value.

2) Acid resistance: A 0.2 ml spot of 40 wt % aqueous sulphuric acid was put onto the test piece, and the degree of staining produced after heating at 60° C. for 15 minutes was assessed visually.

3) Scratch resistance: After coating muddy water (a mixture of JIS Z-8901-84 Type 8 dust/water/car windscreen washer liquid=1/10/2 v/v) onto the test piece with a brush, the test piece was washed for 10 seconds in a car washer with the brushes rotated at 150 rpm. After repeating the above operation 4 times, the degree of rubbing damage to the test piece surface was assessed visually.

4) Bending resistance: The state of detachment of the paint film was assessed visually after testing bending resistance according to JIS K-5400 (1990) 8.1 with a core rod diameter of 10 mm.

5) Recoat adhesion: Basecoat paint and clearcoat paint were painted in 2-coats/1-bake twice by the painting method described previously (baking conditions 140° C.×30 minutes twice), and the state of detachment of the paint film was assessed visually after testing adhesion according to JIS K-5400 (1990) 8.5 with a 2-mm grid size.

6) Resistance to petrol: Swelling, discoloration and detachment of the paint film were assessed visually after immersing the sample for 7 hours in regular petrol at 20° C.

7) Weather resistance: Gloss, discoloration and staining of the paint film were assessed visually after testing the sample for 1500 hours with a sunshine carbon arc lamp (JIS K-5400 (1990) 9.8.1).

From the results above, it is evident that coatings obtained by the method for forming paint films of the present invention are excellent both for acid resistance and scratch resistance, and are also excellent for bending resistance and recoating adhesion.

By contrast, Example 1 acid resistance was weak because in the copolymer of Component (a) used in the clearcoat no cycloalkyl ester of acrylic acid or methacrylic acid was used, and the glass transition temperature of the cured clearcoat paint film was also less than 70° C.

With Comparison Example 2, acid resistance was weak because in the copolymer of Component (a) used in the clearcoat no cycloalkyl ester of acrylic acid or methacrylic acid was used, and the glass transition temperature of the cured clearcoat paint film was less than 70° C. Moreover, scratch resistance was weak because no blocked polyisocyanate compound of Component (c) was used in the clearcoat.

With Comparison Example 3, bending resistance and recoat adhesion were weak because in the copolymer of Component (d) used in the base coat no monomer represented by General Formula (1) was used.

With the method for forming paint films of the present invention, because the clearcoat has as paint film properties a high glass transition temperature and rubber elasticity based on urethane bonding, and the basecoat has soft segments in the crosslinked portion, paint films can be offered which have balanced high levels of performance for both acid-resistance and scratch-resistance, and are also excellent in bending resistance and recoating adhesion.

TABLE 1

| | Clearcoat copolymers | | | | Basecoat copolymers | | |
|---|---|---|---|---|---|---|---|
| | C1 | C2 | C3 | C4 | B1 | B2 | B3 |
| Xylene (pts wt) | 94.5 | 94.5 | 94.5 | 94.5 | 96.0 | 96.0 | 96.0 |
| Components added dropwise (pts wt) | | | | | | | |
| CHMA[1] | 40.0 | — | — | — | — | — | — |
| IBorMA[2] | — | 25.0 | — | — | — | — | — |
| IBorA[3] | — | — | 30.0 | — | — | — | — |
| MMA[4] | 19.3 | 15.2 | 0.1 | 30.0 | 23.3 | 7.3 | 29.2 |
| St[5] | — | — | — | 15.0 | 20.0 | 20.0 | 20.0 |
| 2HEMA[6] | — | 23.2 | 27.8 | 23.2 | — | — | 13.9 |
| 4HBA[7] | 20.5 | — | — | — | — | — | — |
| FM2[8] | — | — | — | — | 38.3 | — | — |
| PP1000[9] | — | — | — | — | — | 53.6 | — |
| BMA[10] | 18.9 | 35.4 | 40.8 | 29.3 | — | — | — |
| EHA[11] | — | — | — | 1.2 | 17.2 | 17.8 | 35.6 |
| AA[12] | 1.3 | 1.3 | 1.3 | 1.3 | 1.3 | 1.3 | 1.3 |
| t-BPBz[13] | 2.5 | 2.5 | 2.5 | 2.5 | 1.0 | 1.0 | 1.0 |
| Added catalyst (pts wt) | | | | | | | |
| t-BPEH[14] | 0.2 | 0.2 | 0.2 | 0.2 | 0.2 | 0.2 | 0.2 |
| Xylene | 2.8 | 2.8 | 2.8 | 2.8 | 2.8 | 2.8 | 2.8 |
| Properties | | | | | | | |
| Heat residue (wt %) | 50 | 50 | 50 | 50 | 50 | 50 | 50 |
| Gardner viscosity (25° C.) | N-O | S | Q-R | S-T | P | U | R-S |
| Glass transition temp. (°C.) | 40 | 60 | 50 | 60 | 0 | 0 | 0 |
| OH value | 80 | 100 | 120 | 100 | 60 | 80 | 60 |
| Acid value | 10 | 10 | 10 | 10 | 10 | 10 | 10 |

TABLE 2

| | Preparation example 2 | Preparation example 3 | Preparation example 4 | Preparation example 5 | Preparation example 6 | Preparation example 7 | Preparation example 8 | Preparation example 9 |
|---|---|---|---|---|---|---|---|---|
| Proportions included (parts by weight) | | | | | | | | |
| Copolymer B1 solution | 100.0 | 100.0 | — | — | 120.0 | 120.0 | 140.0 | — |
| Copolymer B2 solution | — | — | 130.0 | 160.0 | — | — | — | — |
| Copolymer B3 solution | — | — | — | — | — | — | — | 130.0 |
| L-116-70[1] | 35.7 | 21.4 | 21.4 | — | — | — | — | 21.4 |
| Cymel 303[2] | — | — | — | 15.3 | — | — | — | — |
| Yuban 20SE[3] | — | — | — | — | 50.0 | 50.0 | 16.7 | — |
| Takenate XB-72-G16[4] | 25.0 | 41.7 | — | — | — | — | — | — |
| Coronate 2513[5] | — | — | — | — | 6.3 | 6.3 | 18.8 | — |
| CAB 531-1 solution[6] | 66.7 | — | — | — | — | — | — | — |
| CAB 381-2 solution[7] | — | — | — | 33.3 | 33.3 | 33.3 | — | — |
| MG-1 dispersion[8] | — | 28.6 | 57.1 | — | — | — | 14.3 | 57.1 |
| Aluminium paste[9] | 15.4 | 15.4 | 15.4 | 15.4 | 15.4 | — | — | 15.4 |
| Quinacridone[10] | — | — | — | — | — | 36 | 36 | — |
| Red ochre[11] | — | — | — | — | — | 4 | 4 | — |
| UV protector solution[12] | 5.0 | 5.0 | 5.0 | 5.0 | 5.0 | 5.0 | 5.0 | 5.0 |
| PTSA solution[13] | — | — | — | 2.5 | — | — | — | — |
| Modaflo[14] | 0.3 | 0.3 | 0.3 | 0.3 | 0.3 | 0.3 | 0.3 | 0.3 |
| Isobutyl acetate | 20.0 | 10.0 | 10.0 | 10.0 | 10.0 | 40.0 | 40.0 | 10.0 |
| n-Butyl alcohol | 5.0 | 5.0 | 5.0 | 5.0 | 5.0 | 10.0 | 10.0 | 5.0 |

TABLE 3

| | Preparation example 10 | Preparation example 11 | Preparation example 12 | Preparation example 13 | Preparation example 14 | Preparation example 15 | Preparation example 16 | Preparation example 17 |
|---|---|---|---|---|---|---|---|---|
| Proportions included (parts by weight) | | | | | | | | |
| Copolymer $C^1$ solution | 100.0 | 120.0 | — | — | — | — | — | — |
| Copolymer $C^2$ solution | — | — | 140.0 | 160.0 | — | — | — | — |
| Copolymer $C^3$ solution | — | — | — | — | 140.0 | 140.0 | — | — |
| Copolymer $C^4$ solution | — | — | — | — | — | — | 140.0 | 140.0 |
| L-116-70[1] | 21.4 | 50.0 | — | — | — | — | — | — |
| Cymel 303[2] | — | — | 20.4 | 15.3 | — | — | — | — |
| Yuban 20SE[3] | — | — | — | — | 25.0 | 8.3 | 25.0 | 50.0 |
| Takenate XB-72-G16[4] | 58.3 | 8.3 | — | — | — | — | — | — |
| Desmodur BL-3175[5] | — | — | 13.3 | 6.7 | — | — | — | — |
| Coronate 2513[6] | — | — | — | — | 18.8 | 25.0 | 18.8 | — |

TABLE 3-continued

|  | Preparation example 10 | Preparation example 11 | Preparation example 12 | Preparation example 13 | Preparation example 14 | Preparation example 15 | Preparation example 16 | Preparation example 17 |
|---|---|---|---|---|---|---|---|---|
| UV absorber solution[7] | 10.0 | 10.0 | 10.0 | 10.0 | 10.0 | 10.0 | 10.0 | 10.0 |
| Photostabilizer solution[8] | 10.0 | 10.0 | 10.0 | 10.0 | 10.0 | 10.0 | 10.0 | 10.0 |
| PTSA solution[9] | — | — | 2.5 | 2.5 | — | — | — | — |
| Modaflo[10] | 0.8 | 0.8 | 0.8 | 0.8 | 0.8 | 0.8 | 0.8 | 0.8 |
| Xylene | 10.0 | 10.0 | 10.0 | 10.0 | 10.0 | 10.0 | 10.0 | 10.0 |
| n-Butyl alcohol | 5.0 | 5.0 | 5.0 | 5.0 | 5.0 | 5.0 | 5.0 | 5.0 |

TABLE 4

|  | Basecoat paint | Clearcoat paint |
|---|---|---|
| Embodiment 1 | Prep. Example 2 | Prep. Example 10 |
| Embodiment 2 | Prep. Example 3 | Prep. Example 11 |
| Embodiment 3 | Prep. Example 4 | Prep. Example 12 |
| Embodiment 4 | Prep. Example 5 | Prep. Example 13 |
| Embodiment 5 | Prep. Example 6 | Prep. Example 14 |
| Embodiment 6 | Prep. Example 7 | Prep. Example 15 |
| Embodiment 7 | Prep. Example 8 | Prep. Example 15 |
| Comparison 1 | Prep. Example 6 | Prep. Example 16 |
| Comparison 2 | Prep. Example 6 | Prep. Example 17 |
| Comparison 3 | Prep. Example 9 | Prep. Example 12 |

TABLE 5-1

|  | Embodiment 1 | Embodiment 2 | Embodiment 3 | Embodiment 4 | Embodiment 5 |
|---|---|---|---|---|---|
| Clearcoat (wt %) | | | | | |
| Component (a) | Copolymer C1 (50) | Copolymer C1 (60) | Copolymer C2 (70) | Copolymer C2 (80) | Copolymer C3 (70) |
| Component (b) | Super Bekamine L-116-70 (15) | Super Bekamine L-116-70 (35) | Cymel 303 (20) | Cymel 303 (15) | Yuban 20SE (15) |
| Component (c) | Takenate XB-72-G16 (35) | Takenate XB-72-G16 (5) | Desmodur BL-3175 (10) | Desmodur BL-3175 (10) | Coronate 2513 (15) |
| Basecoat (wt %) | | | | | |
| Component (d) | Copolymer B1 (50) | Copolymer B1 (50) | Copolymer B2 (65) | Copolymer B2 (80) | Copolymer B1 (60) |
| Component (e) | Super Bekamine L-116-70 (25) | Super Bekamine L-116-70 (15) | Super Bekamine L-116-70 (15) | Cymel 303 (15) | Yuban 20SE (30) |
| Component (f) | Takenate XB-72-G16 (15) | Takenate XB-72-G16 (25) | — | — | Coronate 2513 (5) |
| Component (g) | CAB 531-1 (10) | — | — | CAB381-2 (5) | CAB381-2 (5) |
| Component (h) | — | MG-1 (10) | MG-1 (20) | — | — |
| Paint film performance | | | | | |
| Glass transition temperature (°C.)[1] | 75 | 80 | 90 | 85 | 87 |
| Acid resistance[2] | No abnormality | No abnormality | No abnormality | No abnormality | No abnormality |
| Scratch resistance[3] | Good | Good | Good | Good | Good |
| Bending resistance[4] | No abnormality | No abnormality | No abnormality | No abnormality | No abnormality |
| Recoat adhesion[5] | No abnormality | No abnormality | No abnormality | No abnormality | No abnormality |
| Petrol resistance[6] | No abnormality | No abnormality | No abnormality | No abnormality | No abnormality |
| Weather resistance[7] | No abnormality | No abnormality | No abnormality | No abnormality | No abnormality |

TABLE 5-2

|  | Embodiment 6 | Embodiment 7 | Comparison 1 | Comparison 2 | Comparison 3 |
| --- | --- | --- | --- | --- | --- |
| Clearcoat (wt %) | | | | | |
| Component (a) | Copolymer C3 (70) | Copolymer C3 (70) | Copolymer C4 (70) | Copolymer C4 (70) | Copolymer C2 (70) |
| Component (b) | Yuban 20SE (5) | Yuban 20SE (5) | Yuban 20SE (15) | Yuban 20SE (30) | Cymel 303 (20) |
| Component (c) | Coronate 2513 (5) | Coronate 2513 (5) | Coronate 2513 (15) | — | BL-3175 (10)[Desmodur] |
| Basecoat (wt %) | | | | | |
| Component (d) | Copolymer B1 (60) | Copolymer B1 (70) | Copolymer B1 (60) | Copolymer B1 (60) | Copolymer B3 (65) |
| Component (e) | Yuban 20SE (30) | Yuban 20SE (10) | Yuban 20SE (30) | Yuban 20SE (30) | Super Bekamine L-116-70 (15) |
| Component (f) | Coronate 2513 (5) | Coronate 2513 (15) | Coronate 2513 (5) | Coronate 2513 (5) | — |
| Component (g) | CAB 381-2 (5) | — | CAB 381-2 (5) | CAB 381-2 (5) | — |
| Component (h) | — | MG-1 (5) | — | — | MG-1 (20) |
| Paint film performance | | | | | |
| Glass transition temperature (°C.)[1] | 83 | 83 | 58 | 65 | 90 |
| Acid resistance[2] | No abnormality | No abnormality | Marked staining | Marked staining | No abnormality |
| Scratch resistance[3] | Good | Good | Good | Marked damage | Good |
| Bending resistance[4] | No abnormality | No abnormality | No abnormality | No abnormality | Paint film detachment |
| Recoat adhesion[5] | No abnormality | No abnormality | No abnormality | No abnormality | Paint film detachment |
| Petrol resistance[6] | No abnormality | No abnormality | No abnormality | No abnormality | No abnormality |
| Weather resistance[7] | No abnormality | No abnormality | No abnormality | No abnormality | No abnormality |

We claim:

1. Method for forming a paint film comprising applying to a substrate to form a coated substrate a basecoat paint including a colouring and then applying a clearcoat paint subsequently curing the basecoat and clearcoat simultaneously by heating, wherein the clearcoat paint includes a resin component comprising (a) a copolymer of a vinyl monomer mixture containing at least 20% by weight cycloalkyl esters of acrylic acid or methacrylic acid 40–90% by weight, (b) an alkyl-etherified melamine resin 5–50% by weight, and (c) blocked polyisocyanate compounds 5–50% by weight, and (a) the basecoat paint includes a resin component comprising (d) a copolymer of a vinyl monomer mixture containing at least 10% by weight monomers represented by the general formula

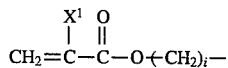   [1]

-continued

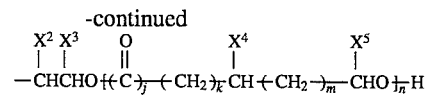

wherein the formula, $X^1$–$X^5$, which may be the same or different, are each a hydrogen atom or a methyl group; i is 0 or 1 or 2; j is 0 or 1, k is 0 or an integer 1–3; m is 0 or an integer 1–3; and n is an integer 1–10; 40–80% by weight, (e) an alkyl-etherified melamine resin 10–50% by weight, (f) blocked polyisocyanate compounds 0–40% by weight, (g) a cellulose resin 0–20% by weight, and (h) crosslinked organic fine particles having a particle size of 0.01–5 μm 0–30% by weight.

2. Method for forming the paint film according to claim 1 wherein the glass transition temperature of the cured clearcoat paint film is at least 70° C.

3. The coated substrate obtained by the method for forming the paint film of claim 1.

4. The coated substrate according to claim 3 wherein the glass transition temperature of the cured clearcoat paint film is at least 70° C.

* * * * *